(12) United States Patent
Ratnasamy et al.

(10) Patent No.: US 11,012,294 B2
(45) Date of Patent: May 18, 2021

(54) INLINE DATA PLANE MONITOR PLACEMENT AND OPERATION FOR NETWORK FUNCTION VIRTUALIZATION

(71) Applicant: Nefeli Networks, Inc., Berkeley, CA (US)

(72) Inventors: Sylvia Ratnasamy, Berkeley, CA (US); Eugenia Corrales, Los Altos Hills, CA (US); Travis Duane Ewert, Highlands Ranch, CO (US)

(73) Assignee: Nefeli Networks, Inc., Berkeley, CA (US)

( * ) Notice: Subject to any disclaimer, the term of this patent is extended or adjusted under 35 U.S.C. 154(b) by 0 days.

(21) Appl. No.: 16/849,660

(22) Filed: Apr. 15, 2020

(65) Prior Publication Data

US 2020/0336369 A1    Oct. 22, 2020

Related U.S. Application Data

(60) Provisional application No. 62/835,309, filed on Apr. 7, 2019.

(51) Int. Cl.
*G06F 15/16* (2006.01)
*H04L 12/24* (2006.01)
*H04L 12/26* (2006.01)

(52) U.S. Cl.
CPC ...... *H04L 41/0803* (2013.01); *H04L 43/0876* (2013.01)

(58) Field of Classification Search
CPC ........................ H04L 41/0803; H04L 43/0876
USPC ....................................................... 709/220
See application file for complete search history.

(56) References Cited

U.S. PATENT DOCUMENTS

| | | | | |
|---|---|---|---|---|
| 9,270,754 | B2 * | 2/2016 | Iyengar | H04L 12/4641 |
| 9,330,156 | B2 * | 5/2016 | Satapathy | H04L 67/1097 |
| 9,413,655 | B2 | 8/2016 | Shatzkamer et al. | |
| 9,436,443 | B2 | 9/2016 | Chiosi et al. | |
| 9,445,279 | B2 * | 9/2016 | Li | H04W 16/18 |
| 9,491,063 | B2 * | 11/2016 | Kempf | G06F 9/5072 |

(Continued)

FOREIGN PATENT DOCUMENTS

KR    20180012325 A    2/2018

OTHER PUBLICATIONS

Barefoot Deep Insight—Product Brief, Barefoot Networks, 2018, 6 pages, Accessed on Nov. 2, 2018.
Brown, Virtual Probes for NFVI Monitoring, A Heaving Reading white paper produced for Intel and Qosmos, a division on ENEA, Feb. 2007, 10 pages.

(Continued)

*Primary Examiner* — Moustafa M Meky
(74) *Attorney, Agent, or Firm* — MLO, a professional corp.

(57) ABSTRACT

A method for inline data plane monitor placement and operation for network function virtualization involves receiving, at one or more control modules of a network, a logical monitoring specification. The logical monitoring specification includes a monitoring regime abstracted from a physical topology of the network. The one or more control modules perform one or more of instantiating or identifying one or more monitor instances of the network based on the logical monitoring specification, the one or more monitor instances being or having been instantiated within one or more data plane components of the network. The one or more control modules configure the one or more monitor instances based on the logical monitoring specification.

24 Claims, 13 Drawing Sheets

(56) References Cited

U.S. PATENT DOCUMENTS

| | | | |
|---|---|---|---|
| 9,622,019 B2* | 4/2017 | Li | H04L 12/66 |
| 9,755,942 B2* | 9/2017 | Leogrande | H04L 41/0681 |
| 9,860,758 B2* | 1/2018 | Li | H04W 16/18 |
| 10,555,150 B2* | 2/2020 | Li | H04L 41/0853 |
| 2002/0107958 A1 | 8/2002 | Faraldo | |
| 2014/0040975 A1 | 2/2014 | Raleigh et al. | |
| 2014/0229945 A1 | 8/2014 | Barkai et al. | |
| 2014/0317293 A1 | 10/2014 | Shatzkamer | |
| 2014/0348161 A1 | 11/2014 | Koponen et al. | |
| 2015/0112933 A1* | 4/2015 | Satapathy | H04L 41/5019 707/634 |
| 2015/0120905 A1* | 4/2015 | Leogrande | H04L 41/0681 709/224 |
| 2015/0195197 A1 | 7/2015 | Yong et al. | |
| 2015/0256397 A1 | 9/2015 | Agarwal | |
| 2015/0365322 A1 | 12/2015 | Shatzkamer et al. | |
| 2015/0381423 A1 | 12/2015 | Xiang | |
| 2016/0062746 A1 | 3/2016 | Chiosi et al. | |
| 2016/0127465 A1 | 5/2016 | Barstow et al. | |
| 2016/0156513 A1 | 6/2016 | Zhang et al. | |
| 2016/0157043 A1* | 6/2016 | Li | H04L 41/12 370/254 |
| 2016/0205005 A1 | 7/2016 | Lee | |
| 2016/0226913 A1 | 8/2016 | Sood et al. | |
| 2016/0261495 A1 | 9/2016 | Xia et al. | |
| 2016/0352924 A1 | 12/2016 | Senarath et al. | |
| 2016/0371063 A1 | 12/2016 | Chiosi et al. | |
| 2016/0373302 A1 | 12/2016 | Sigoure | |
| 2016/0373474 A1 | 12/2016 | Sood et al. | |
| 2017/0005947 A1 | 1/2017 | Chu | |
| 2017/0085459 A1 | 3/2017 | Xia et al. | |
| 2017/0163540 A1* | 6/2017 | Li | H04L 45/64 |
| 2017/0170990 A1 | 6/2017 | Gaddehosur et al. | |
| 2017/0177396 A1 | 6/2017 | Palermo et al. | |
| 2018/0069798 A1 | 3/2018 | Bacik et al. | |
| 2018/0084436 A1* | 3/2018 | Li | H04W 88/16 |
| 2019/0052549 A1 | 2/2019 | Duggal et al. | |

OTHER PUBLICATIONS

Chirivella-Perez et al., NFVMon: Enabling Multioperator Flow Monitoring in 5G Mobile Edge Computing, Wireless Communications and Mobile Computing, vol. 2018, Aug. 14, 2018, 16 pages.

International Search Report dated Nov. 18, 2019 for PCT Patent Application No. PCT/US2019/044802.

Jeong, Design and Implementation of Virtual TAP for Software-Defined Networks, Department of Computer Science and EngineeringPohang University of Science and Technology, Master's Thesis, Dec. 14, 2017, 2018, 45 pages.

Liu et al., NetAlytics: Cloud-Scale Application Performance Monitoring with SDN and NFV, Middleware '16: Proceedings of the 17th International Middleware Conference, Nov. 2016, Article No. 8 pp. 1-14.

Naik et al., NFVPerf: Online Performance Monitoring and Bottleneck Detection for NFV, 2016 IEEE Conference on Network Function Virtualization and Software Defined Networks (NFV-SDN), Palo Alto, CA, Nov. 2016, pp. 154-160.

Nelson et al., Switches are Monitors Too! Stateful Property Monitoring as a Switch Design Criterion, ACM SIGCOMM Workshop on Hot Topics in Networks, Nov. 2016, 7 pages.

Notice of Allowance dated Nov. 8, 2018 for U.S. Appl. No. 16/102,375.

Palkar, et al., E2: A Framework for NFV Applications, SOSP'15, Oct. 2015, 16 pages.

Rodriguez-Natal, et al., Global State, Local Decisions: Decentralized NFV for ISPs via enhanced SDN, Article in IEEE Communications Magazine, Apr. 2017, 8 pages.

Soenen et al., Optimising Microservice-based Reliable NFV Management & Orchestration Architectures, 2017 9th International Workshop on Resilient Network Design and Modeling (RNDM), Sep. 4-6, 2017. 7 pages.

Zha et al., Instrumenting Open vSwitch with Monitoring Capabilities: Designs and Challenges, SOSR '18: Proceedings of the Symposium on SDN Research, Mar. 2018 Article No. 16, pp. 1-7.

Office Action dated Dec. 28, 2020 for U.S. Appl. No. 16/361,504.

* cited by examiner

400

INLINE DATA PLANE MONITOR PLACEMENT AND OPERATION FOR NETWORK FUNCTION VIRTUALIZATION

RELATED APPLICATIONS

This application claims priority to U.S. Provisional Patent Application No. 62/835,309 filed on Apr. 17, 2019 and entitled "Inline Data Plane Monitor Placement and Operation for Network Function Virtualization", and is related to U.S. patent application Ser. No. 16/102,375 filed on Aug. 13, 2018, and entitled "Modular System Framework for Software Network Function Automation", all of which are hereby incorporated by reference for all purposes.

BACKGROUND

Software network functions (NFs) are software applications that implement advanced traffic processing functions; i.e., inspecting, modifying, or otherwise processing the packets in a network traffic stream. Examples of NFs include network intrusion detection systems (IDS), protocol or WAN optimizers, firewalls, Network Address Translators (NATs), and so forth. Within a network, different traffic streams may be processed by different network function virtualization (NFV) services. An NFV service can include a single NF or a chained sequence of NFs. In a conventional scenario, a network operator will define how different traffic streams should be processed by an NFV service within a data center using a high-level abstraction—e.g., using an abstract modeling language such as TOSCA (Topology and Orchestration Specification for Cloud Applications) or a graphical user interface (GUI). This high-level specification, referred to as a network function virtualization (NFV) policy graph, is an NFV policy specification which defines how traffic should be processed by different NFs of an NFV service and may be applied to all traffic to/from a particular customer or tenant of a network within the data center. Additionally, the NFV policy specification may optionally include constraints such as target performance levels (min and/or max) of the NFs or other components of the network.

In such data center operations, there is often a continual measurement of key operational metrics to ensure optimal performance of data center systems. These metrics include CPU utilization, memory utilization, latency, and throughput, among others. When one or more of these metrics reach a respective critical threshold, system alerts are issued, and actions are triggered. Actions can include further alerts, automated corrective actions and/or logging of key information for future use.

In addition, there is often a continual stream of change management procedures that are needed to maintain the data center systems in optimal condition. These often include upgrades for multiple pieces of software and hardware in a system, which could include several dozen different schedules, or changes requested by customers such as adding new features to their services. Changes can also be triggered by the metrics mentioned above. Additionally, NF vendors often receive payment from the operators through different metering schemes, many of which conventionally rely on indirect measurements of usage, such as per core used, or per server used.

SUMMARY

In some embodiments, a method involves receiving, at one or more control modules of a network, a logical monitoring specification. The logical monitoring specification includes a monitoring regime abstracted from a physical topology of the network. The one or more control modules perform one of instantiating or identifying one or more monitor instances of the network based on the logical monitoring specification, the one or more monitor instances being or having been instantiated within one or more data plane components of the network. The one or more control modules configure the one or more monitor instances based on the logical monitoring specification.

DETAILED DESCRIPTION

In data center operations, there is often a need for continual measurement of key operational metrics. These metrics include a central processing unit (CPU) utilization, memory utilization, network latency, network throughput, software service usage, and many others. Often, when one or more of these metrics reach a respective critical threshold, system alerts are issued, and actions are triggered. These actions can include further alerts, automated corrective actions and/or logging of key information for future use. In addition, there is often a continual stream of change management procedures that are needed to maintain the data center systems in optimal condition. These often include upgrades for multiple pieces of software and hardware in a system, which could include several dozen different schedules, or changes requested by data center customers such as adding new features to their services. These changes can also be triggered by the metrics mentioned above.

Additionally, software vendors often receive payment from the data center operator through different metering schemes, many of which rely on indirect measurements of usage, such as per core used, or per server used. There is a strong desire by data center operators to pay for the dozens of software services in a data center based on actual usage of the software services, such as throughput, rather than based on such indirect measurements. This creates a strong motivation for data center operators to measure actual throughput or other key usage metrics of the system in an independent and credible fashion.

Figure 1:
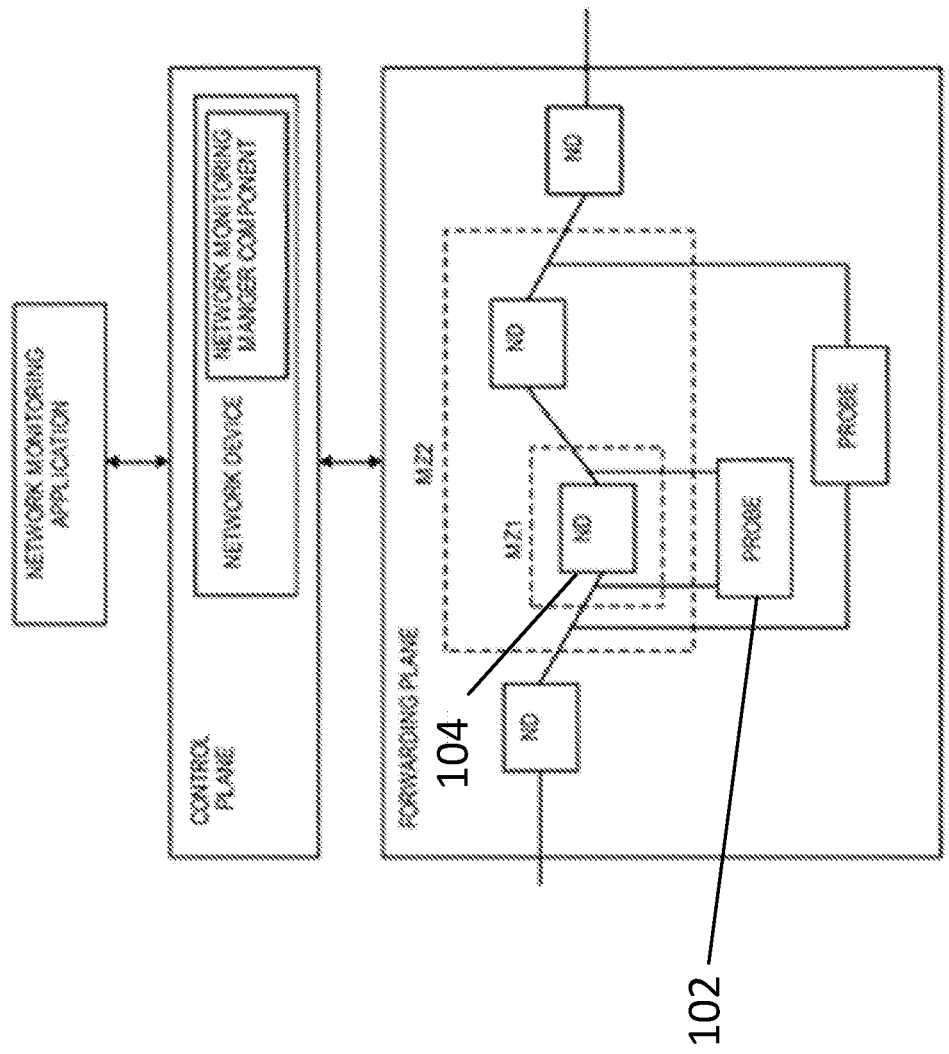
FIGS. 1-2 are simplified views of conventional architectures for monitoring network components.
Figure 2:
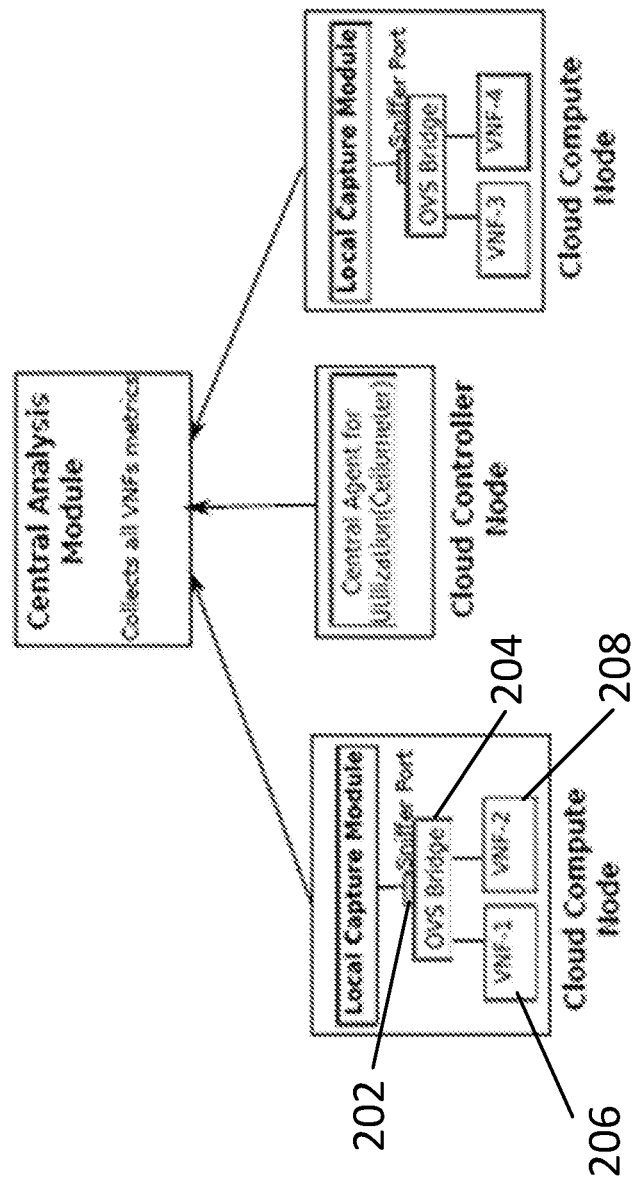

The above requirements must be met even in the context of virtualized network services as enabled by network function virtualization (NFV). However, in NFV contexts, meeting the above requirements with traditional/existing network monitoring technologies is problematic due to a number of reasons. One such reason is poor efficiency and scalability of conventional monitoring solutions. Conventional network monitoring solutions, such as those shown in FIG. 1 and FIG. 2, typically rely on network packet/port mirroring in which network packets are replicated to a standalone monitoring system for offline/off-to-the-side processing. For example, a network 100 shown in FIG. 1 includes a probe 102 that mirrors (i.e., duplicates) network packets on entry and egress from a network node 104. As another example, a network 200 shown in FIG. 2 includes a sniffer port 202 at a network traffic bridge 204 that mirrors network packets associated with network nodes 206, 208. Such solutions may be inefficient and may not scale to monitoring large volumes of network traffic.

Additionally, conventional monitoring solutions may be inflexible and suffer from limited functionality. Many conventional monitoring systems rely on static or fixed rules to define which network packets get monitored and how. Even programmable monitoring systems conventionally export only a simple (i.e., inflexible) match-action programming capability in which simple pattern-based filters are used to select network packets for monitoring. Likewise, actions taken based on the monitoring are likewise simple, e.g., increasing counters, generating simple statistics, or raising an alarm.

Another shortcoming of conventional solutions includes a fragmented solution space. That is, independent systems and application programming interfaces (APIs) of software applications, such as software network functions (NFs), are conventionally used for monitoring related to network performance, anomalies, and business processes such as billing for NF usage and licensing. As a result, data center operators often have to train on, deploy and operate multiple disjoint monitoring systems.

Such conventional monitoring solutions are also often not suited to modern "scale-out" software designs (i.e., in which one or more instances of an NF are added to the network based on throughput, latency, or other metrics). In current distributed systems, event processing takes place at multiple nodes of the network, which may make it difficult to obtain an end-to-end "picture" of system performance. Additionally, such distribution may make it difficult to correlate behavior across multiple nodes of the data center network. For example, in an NFV system, a network packet may be processed by multiple NF instances that are running at different compute nodes (e.g., servers) of the network. Such arrangements may make it difficult to determine a breakdown of a network packet's end-to-end latency through the NFV service, or to determine where performance bottlenecks lie within the NFV service.

Additionally, conventional monitoring solutions often suffer from complex dependencies. In current NFV systems, inferring the state of the system or packet-processing performance often relies on invoking APIs that the NFs of the network provide to expose key performance indicators (KPIs). However, there is little standardization across NFs and hence NFs differ not just in the nature of the APIs and the KPIs they export but also in the semantics of those KPIs (e.g., the sampling interval, the aggregation method used for summary statistics, etc.). Such differences may make building a monitoring system cumbersome (e.g., because the monitoring system may need to be updated for every new NF introduced, including NF upgrades) as well as unreliable (e.g., since the metrics exported by each NF may need to be validated and potentially normalized). A particular example of such a scenario is when a monitoring system relies on per-NF APIs to determine whether the NF instance is currently overloaded or underloaded.

Beyond the above shortcomings, conventional monitoring solutions are often not suited for virtual deployments. Inserting a measurement/monitoring probe typically requires knowing where (e.g., at which compute node) to place the probe. In traditional network designs, this decision was simple and was often manually performed based on knowledge of the physical appliances and/or physical network topology. However, in a virtualized NFV context, multiple instances of NFs can be running at any one of multiple compute nodes and these locations may change over the duration of the service (due to failures, virtual machine (VM) migration, scale up/down events, etc.). Hence, such conventional solutions often lack an approach to automatically place monitoring probes at the correct locations within the network.

As mentioned above, many conventional monitoring systems often rely on mirroring network traffic to a separate monitoring entity. Such mirroring is inefficient (in terms of CPU and network resource utilization), expensive to scale to large network traffic volumes, and may make it difficult to control network traffic "in flight." Some of the above requirements are addressed in conventional monitoring solutions by piecing together information from multiple sources in the system, such as the operating system (OS) and/or the NFs. Such monitoring solutions are time-consuming for network operators and are often custom to each use case. Such monitoring solutions also conventionally rely on indirect data gained from the NFs themselves through proprietary interfaces of the NFs. In summary, such conventional monitoring solutions are often complex, time-consuming, manual in many cases, and not easily transferable. All of these characteristics drive the data center operator's cost structure up and reduce the data center operator's ability to respond to market changes quickly.

Embodiments of systems and methods for placing and operating monitors for network function virtualization (NFV) are disclosed herein. Such systems and methods involve monitoring at a data plane component of a network, such as a virtual network switch (i.e., a software network switch), that runs at each of the compute nodes (e.g., servers) of the network upon which software network functions (NFs) run. A network data plane, also sometimes referred to as a forwarding plane, is an area of operation of a network which carries user packets. The data plane of a network is typically considered to be distinct from a control plane of a network, i.e., a portion of the network which carries network control and management packets. Placement of monitor instances within a data plane of a network, as disclosed herein, advantageously provides a single uniform location at which to extract and/or control the measurement and monitoring process, thus avoiding the above conventional problems of fragmented systems and complex dependencies on each NF. Because the monitors are placed within data plane components, such monitoring is advantageously performed directly inline rather than mirroring traffic for "on-the-side" processing as performed by the conventional monitoring examples shown in FIGS. 1-2. Such systems and methods advantageously may include flexible, compiled or scripted, software processes to determine what gets measured, and how measurements are processed as compared to fixed/limited filters and match-action rules used by conventional monitoring solutions. For example, such software processes may be operable to determine what/whether to measure based on network packet contents (i.e., deep packet inspection (DPI)), measurement state (including history), runtime state, policy variables, calendar events, time-of-day, and so on. Additionally, such systems and methods advantageously may dynamically adapt the granularity of the measurements performed based on a current load of NFs and/or the network, or, based on other criteria.

In some embodiments, monitor instances are programmed and/or configured using control modules of the network, such as an NFV controller/orchestrator, which also program the data plane component (e.g., a software-defined switch) at each compute node and thereby enables correlated measurements (e.g., life-of-a-packet tracing as described herein) as well as programmable monitoring based on a logically centralized and end-to-end view of the NFV service. Thus, such systems and methods are advantageously well-suited to scale-out and virtualized deployments.

Figure 3:
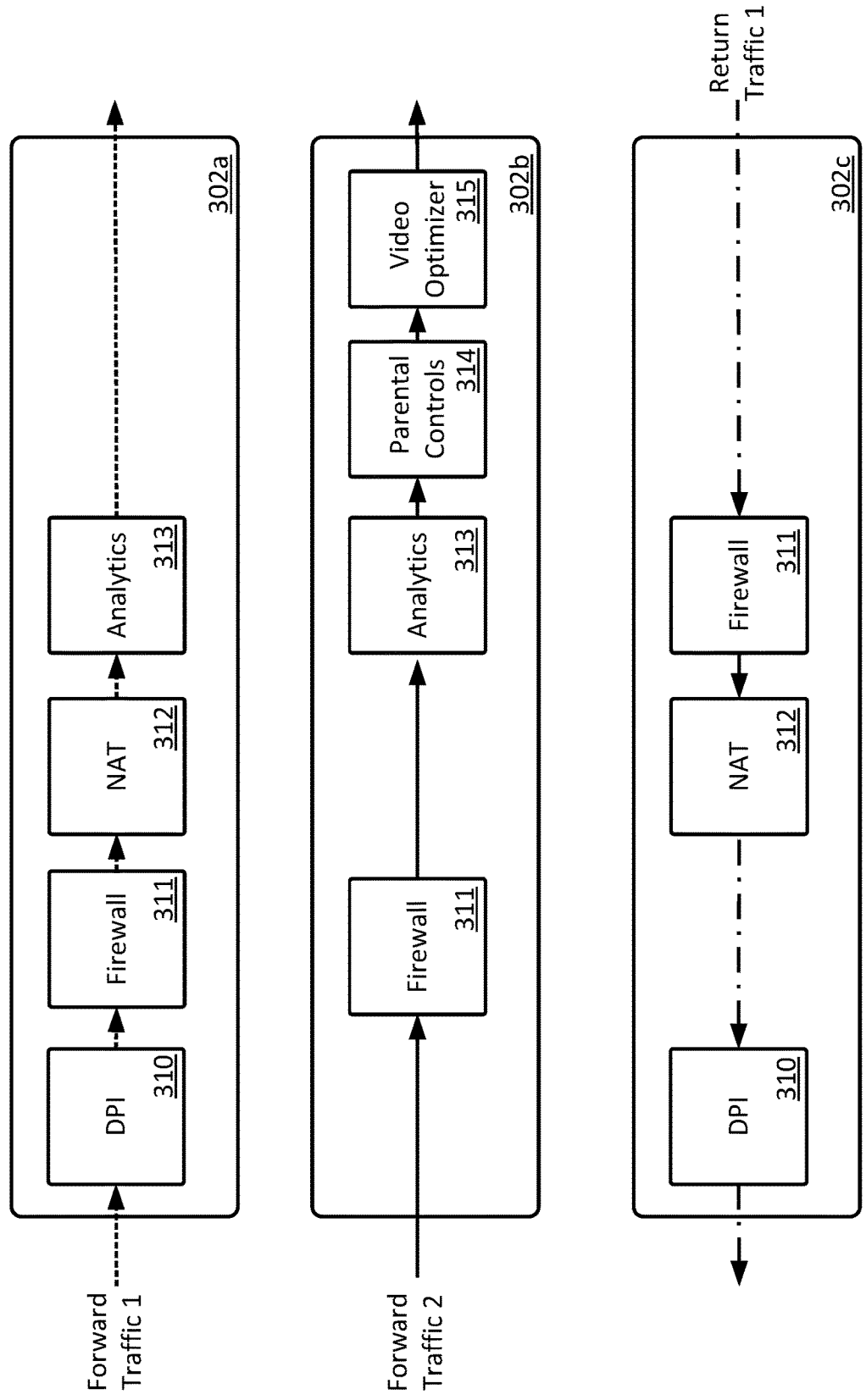
FIG. 3 illustrates example software function chains (SFCs) of software network functions (NFs), in accordance with some embodiments.

FIG. 3 includes examples of logical network service function chains (SFCs) 302a-c of a network 300, in accordance with some embodiments. Each of the logical network service function chains 302a-c includes one or more software network functions (NFs) 310-315. The NFs 310-315 of the example logical network service function chains 302a-c forward, drop, inspect, modify, or perform other operations on bidirectional network traffic of the network 300. Typically, such NFs are implemented as a "bump in the wire," or as a "middle box," of a network. That is, bidirectional network traffic of the network traverses through one or more NFs 310-315 but does not necessarily originate or terminate at one of the NFs 310-315.

Different network packet flows of the network 300 may traverse different logical network service function chains 302a-c of the network 300. A network packet flow is considered to be two or more network packets which are contextually or logically associated with each other. In the example shown in FIG. 3, a network packet flow designated as Forward Traffic 1 of the network 300 traverses the logical network service function chain 302a, and a network packet flow designated as Forward Traffic 2 traverses the logical network service function chain 302b. As shown, the logical network service function chain 302a includes a deep packet inspection (DPI) NF 310, a firewall NF 311, a network address translator (NAT) NF 312, and an analytics NF 313. The logical network service function chain 302b includes the firewall NF 311, the analytics NF 313, a parental controls NF 314, and a video optimizer NF 315.

In some instances, some return network packets of a network packet flow traverse a different network service function chain than other network packets of that network packet flow traversed when travelling in a forward traffic direction. In other instances, return network traffic associated with a network packet flow traverses the same network service function chain that other network packets of that network packet flow traversed when traveling in a forward traffic direction. Return Traffic 1 of the network 300 includes network packets associated with the flow of Forward Traffic 1, but which are traveling in a return traffic direction relative to Forward Traffic 1. As shown, Return Traffic 1 traverses the firewall NF 311, the NAT NF 312, and the DPI NF 310 of the logical network service function chain 302c.

For each of the SFCs 302a-302c, a network operator or customer may need or desire to monitor network packets corresponding to Forward Traffic 1, Forward Traffic 2, and/or Return Traffic 1 as the respective network packets traverse one or more of the NFs 310-315 Similarly, the network operator may need to measure a usage, latency, throughput, or another attribute of one or more of the NFs 310-315. In some instances, the network operator may desire such monitoring to be performed based on one or more monitoring criteria being met. Additionally, the network operator may desire that an action be taken based on the monitoring. Systems and methods disclosed herein advantageously enable the network operator to specify at a logical level by a logical monitoring specification what is monitored, how it is to be monitored, under what circumstances it shall be monitored, and what action or actions should be taken based on that monitoring. Such systems and methods advantageously enable the network operator to specify the above without needing to know specifics of the network, e.g., where each NF of an SFC is physically instantiated within the network. An instantiated component of the network is a component that has been provisioned, installed, executed, enabled, or has otherwise been caused to be running in the network. An instance of a network component is a network component that has been instantiated. As additional NFs are instantiated or moved to other compute nodes of the network, or even to another data center, a given logical monitoring specification advantageously does not need to be updated by the network operator. In this context "logical" means defined or specified without knowledge of, and/or without regard to, an actual physical placement of monitor instances and/or NFs and/or data plane components within the network 300. Thus, a logical monitoring specification advantageously provides a monitoring regime that is abstracted from a physical topology of the network.

Figure 4:
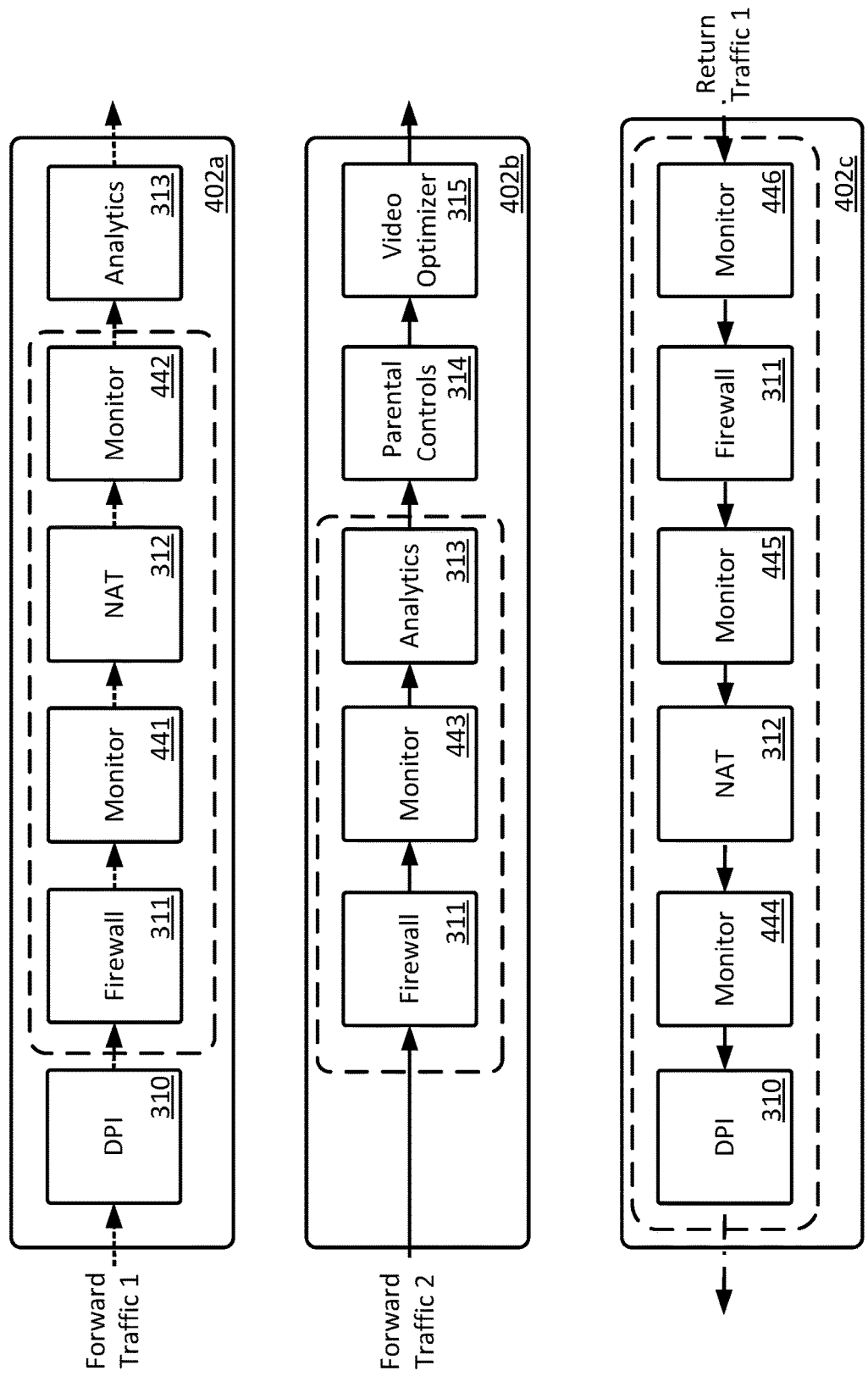
FIG. 4 illustrates aspects of example logical monitoring specifications of the SFCs shown in FIG. 3, in accordance with some embodiments.

For example, FIG. 4 includes aspects of simplified monitoring examples of the logical SFCs 402a-c of a network 400, in accordance with some embodiments. As shown, within a logical SFC 402a, logical monitors 441, 442 are specified to monitor network packets corresponding to Forward Traffic 1 as the network packets propagate from the Firewall NF 311, to the NAT NF 312, and then to the Analytics NF 313. The logical monitors 441, 442 may also be specified to directly measure a network packet throughput of one or more of the NFs of the logical SFC 402a. As mentioned above, placement of the logical monitors 441, 442 are shown in a logical context, that is, without regard to which compute nodes the logical monitors 441, 442 are physically instantiated at within the network 400.

Similarly, within a logical SFC 402b, a logical monitor 443 is specified to monitor network packets corresponding to Forward Traffic 2 as the network packets propagate from the firewall NF 311 to the analytics NF 313. Once again, placement of the monitor 443 is shown in a logical context. Thus, a monitoring regime that includes one or more of what within the network is to be monitored, when it is to be monitored, and what shall result from that monitoring is abstracted from the physical topology (e.g., the actual placement of the NFs and monitor instances) of the network.

As another example, within a logical SFC 402c, logical monitors 444, 445, 446 are specified, in a logical context, to monitor network packets corresponding to Return Traffic 1 as the network packets propagate into the firewall NF 311, to the NAT NF 312, and then to the DPI NF 310.

Figure 5:
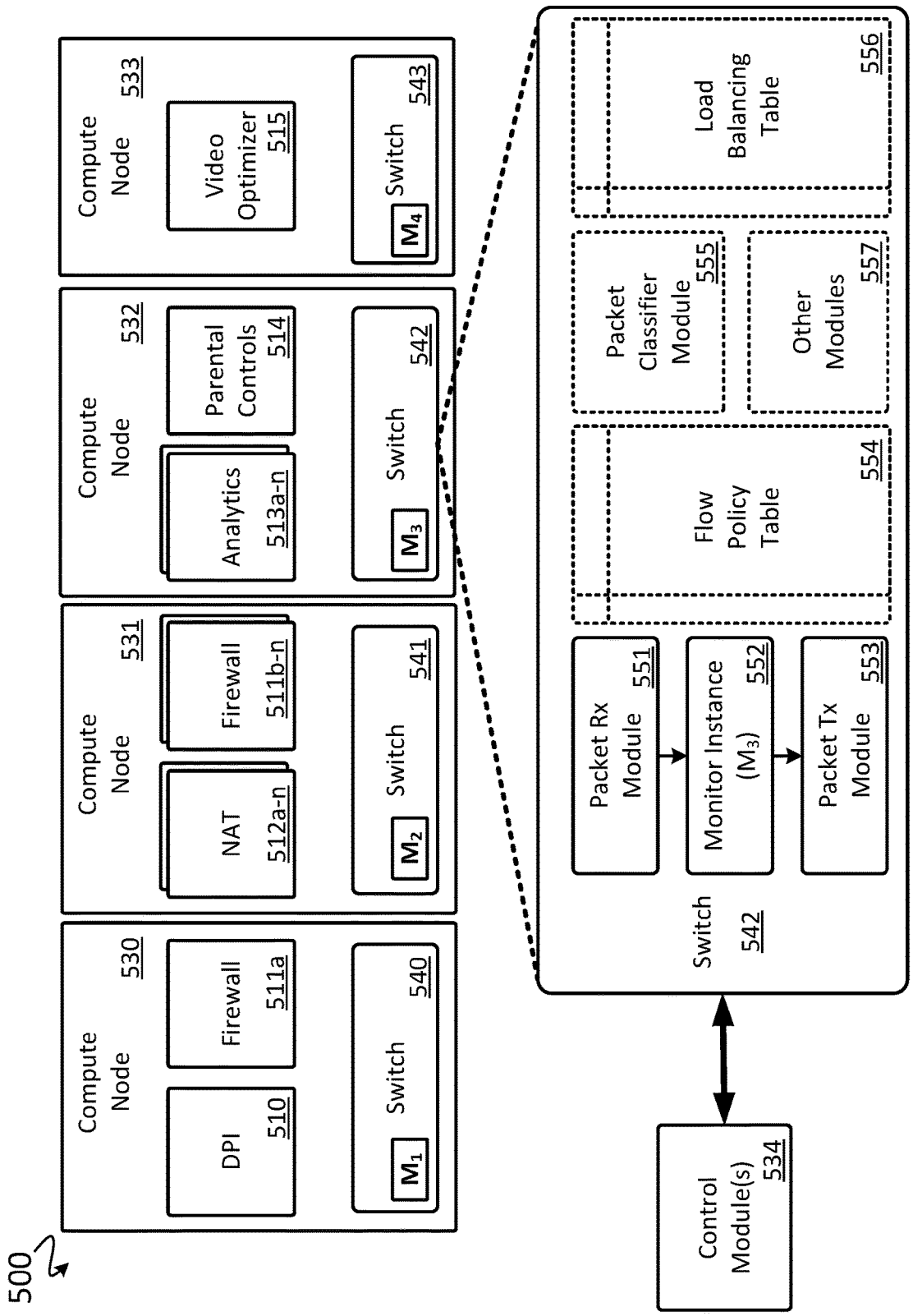
FIG. 5 illustrates a simplified example architecture of a network for inline data plane monitor placement and operation to monitor aspects of the SFCs shown in FIG. 4, in accordance with some embodiments.

FIG. 5 illustrates a simplified example architecture of a network 500 in which previously described NFs and monitors are instantiated, in accordance with some embodiments. The network 500 generally includes compute nodes 530-533, one or more control module(s) 534, and network switches 540-543 (i.e., data plane elements). Each of the network switches 540-543 is instantiated at a respective one of the compute nodes 530-533. In some embodiments, each of the network switches 540-543 is implemented as a software network switch operable to be programmed and/or configured by one or more of the control module(s) 534. The physical topology of the network 500 implements the logical SFCs 402a-c and the logical monitors 441-446 shown in FIG. 4. As shown, each of the logically specified NFs 310-315 of FIG. 4 is implemented as one or more NF instances 510-515 distributed across the compute nodes 530-533. For example, the logical DPI NF 310 is implemented as a DPI NF instance 510 at the compute node 530, the logical firewall NF 311 is implemented as multiple firewall NF instances 511a-n at the compute nodes 530, 531, the logical NAT NF 312 is implemented as multiple NAT NF instances 512a-n at the compute node 531, the logical analytics NF 313 is implemented as multiple analytics NF instances 513a-n at the compute node 532, the logical parental controls NF 314 is implemented as a parental controls NF instance 514 at the compute node 532, and the logical video optimizer NF 315 is implemented as a video optimizer NF instance 515 at the compute node 533.

Additionally, each of the logical monitors 441-446 of FIG. 4 is implemented as one or more monitor instances distributed across the compute nodes 530-533. In accordance with some embodiments, each of the logical monitors 441-446 is implemented as a respective monitor module $M_{1-4}$ instantiated respectively at the network switches 540-543. An exploded view of the network switch 542 provides a simplified example embodiment of one or more of the network switches 540-543. As shown, the network switch 542 generally includes a network packet reception (Rx) module 551, a monitor instance $M_3$ 552, a network packet transmission (Tx) module 553, an optional flow policy table 554, an optional packet classifier module 555, an optional load balancing table 556, and optionally one or more other modules 557. Described at a high level, the optional flow policy table 554 associates network packet flows of the network 500 with logical network function chains similar to those discussed with reference to FIGS. 3 and 4. The optional packet classifier module 555 steers packets of a network traffic flow to particular instances of NFs within a network service function chain. The optional load balancing table 556 is used to distribute network traffic flows across the multiple instances of the NFs 510-515.

In some embodiments, the monitor instances $M_1$-$M_4$ are implemented as respective programmable software modules. In such embodiments, each of the monitor instances $M_{1-4}$ of the network switches 540-543 is advantageously operable to be implemented as a different software process (i.e., a computer executable routine generated based on a set of instructions which may be compiled or executed as a script) having, in some examples, different code bases, as compared to conventional monitoring solutions which may only be configurable within a simple match-action or rules-based context. A code base in this example is a set of instructions or source code that provide a base-line behavior or framework for monitoring. Conventional monitoring solutions may employ a same code base upon which different match action rules are configured, in contrast to monitor instances disclosed herein which advantageously can be implemented with arbitrarily different code. For example, the monitor instance $M_1$ of the network switch 540 may be programmed substantially differently than the monitor instance $M_2$ of the network switch 541. In such embodiments, the control module(s) 534 are operable, for example, to initialize (e.g., install, execute, configure, or modify) a first software process at a first monitor instance (e.g., $M_1$) and initialize a second, substantially different, software process at a second monitor instance (e.g., $M_2$). Thus, each of the monitor instance $M_{1-4}$ is operable to perform monitoring based on programmable monitoring criteria, to programmatically monitor attributes of the network 500 and network traffic, and to programmatically generate outputs and perform actions based on the monitored attributes of the network 500 and network traffic.

In some embodiments, each of the monitor instances $M_{1-4}$ is operable to perform monitoring based on configurable monitoring criteria, to monitor attributes of the network 500 and network traffic based on a configuration, and to generate outputs and perform actions based on a configuration. In some embodiments, one or more of the control module(s) 534 programs or configures the monitor instances $M_{1-4}$.

Figure 6:
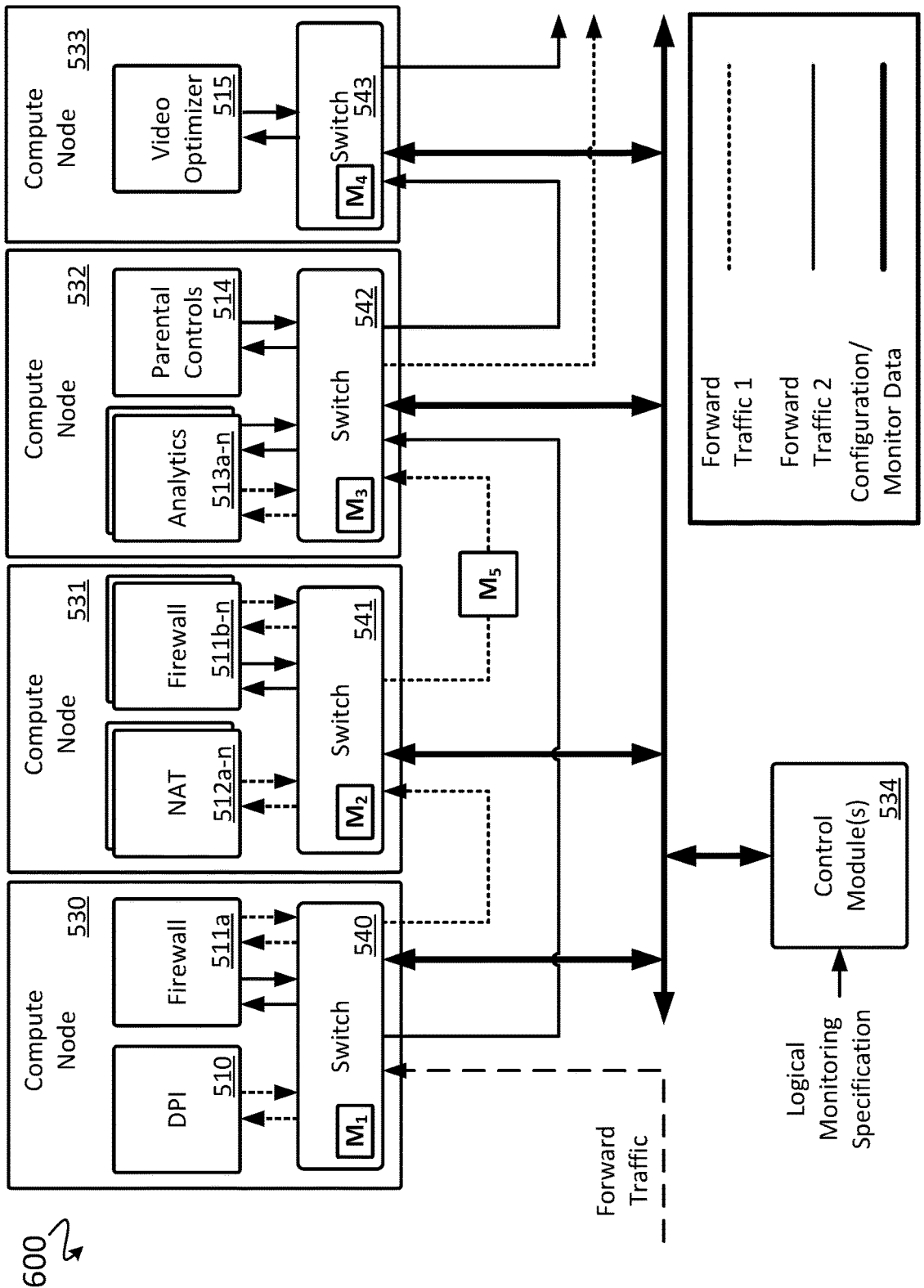
FIGS. 6-7 illustrate network traffic streams traversing the example network shown in FIG. 5, in accordance with some embodiments.

FIG. 6 illustrates a simplified example forward network traffic flow through an example architecture of a network 600, in accordance with some embodiments. The network 600 generally includes the compute nodes 530-533, the NF instances 510-515, the network switches 540-543, the monitor instances $M_1$-$M_4$, and the one or more control module(s) 534 previously described with reference to FIG. 5. Additionally, the network 600 includes an example of an optional monitor instance $M_5$ that is implemented in-line (e.g., does not mirror or duplicate network packets) in a data plane of the network 600 but is not instantiated within one of the network switches 540-543.

In the example shown, a network packet flow designated as Forward Traffic (i.e., network packets propagating through the network 600 in a first direction) is received at the network switch 540. The network packet flow Forward Traffic includes network packets associated with Forward Traffic 1 and Forward Traffic 2, both of which were introduced with reference to FIGS. 3-4.

As shown, a logical monitoring specification is received at the control module(s) 534. In some embodiments, the control module(s) 534 receive the logical monitoring specification from a controller or other component of the network 600. In other embodiments, the control module(s) 534 receive the logical monitoring specification from an interface to the network 600 which enables a network operator and/or a customer to specify all or a portion of the logical monitoring specification (e.g., by using a user interface on a network terminal, on a mobile device, on a web interface, on an App, etc.).

The control module(s) 534 use the logical monitoring specification to determine a programming and/or configuration of the monitor instances $M_1$-$M_4$ (and optionally $M_5$) such that the network packets associated with Forward Traffic 1 are monitored in accordance with the logical monitoring arrangement specified in the SFC 402a. That is, the control module(s) 534 map (i.e., identify a physical instantiation of a network component that corresponds to a logical abstraction of that network component) or transform the logical monitoring specification into a physical embodiment of monitoring instances within the network 600. In this example, the logical monitor 441 is implemented as the monitor instance $M_1$ at the network switch 540 and/or the monitor instance $M_2$ at the network switch 541 to monitor network packets as they propagate from one or more of the firewall NF instances 511a-n to one or more of the NAT NF instances 512a-n. Similarly, the logical monitor 442 is implemented as the monitor instance $M_2$ at the network switch 541 and/or the monitor instance $M_3$ at the network switch 542 and/or the monitor instance $M_5$ to monitor network packets as they propagate from one or more of the NAT NF instances 512a-n to one or more of the analytics NF instances 513a-n.

In some embodiments, a monitoring instance (e.g., $M_2$) is implemented at the compute node (e.g., 531) at which the monitored NF instance (e.g., the NAT NF instance 512a) is instantiated. In such embodiments, a data center or network operator advantageously does not need to know where the compute node or the monitored NF instance are implemented within the network 600. Rather, the operator can simply specify that a particular local network service chain or NF is to be monitored and the control modules(s) advantageously implement monitors where needed. Such monitoring is operable to determine an actual packet throughput of each of monitored NFs, advantageously providing a direct usage measurement of the respective monitored NFs as compared to indirect methods (e.g., CPU usage) used by conventional monitoring solutions.

As another example, the one or more control module(s) 534 use the logical monitoring specification to determine a programming and/or configuration of the monitor instances $M_1$-$M_4$ (and optionally monitor instance $M_5$) such that the network packets associated with Forward Traffic 2 are monitored in accordance with the logical monitoring arrangement specified in the SFC 402b. In this example, the logical monitor 443 is implemented as the monitor instance $M_1$ at the network switch 540 and/or the monitor instance $M_3$ at the network switch 542 to monitor network packets as they propagate from the firewall NF instance 511a to one or more of the analytics NF instances 513a-n.

Figure 7:
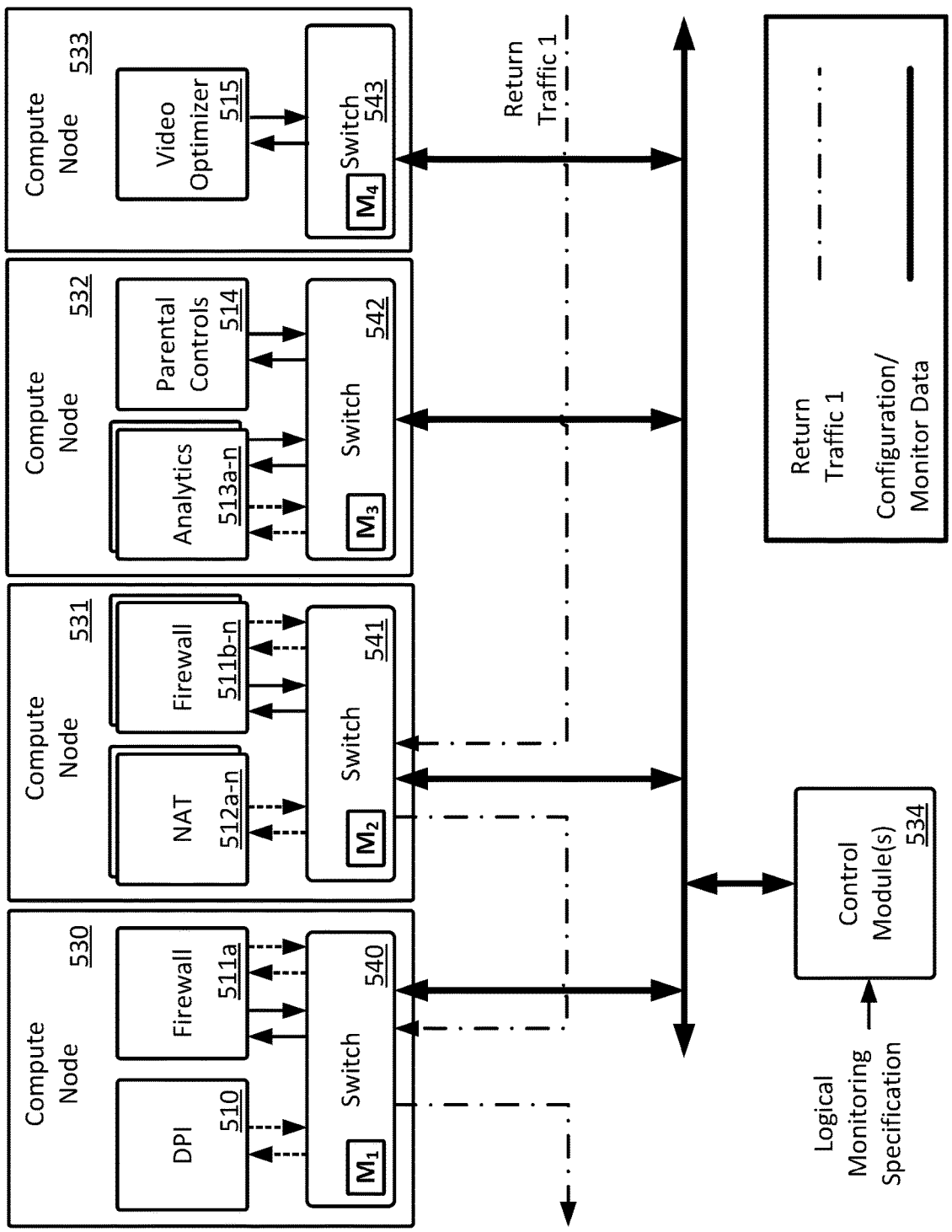

As yet another example, FIG. 7 illustrates the simplified example network 600 in which return traffic flows through the previously described NFs 510-515 and monitor instances $M_1$-$M_4$, in accordance with some embodiments. As previously described, the control module(s) 534 use the logical monitoring specification to determine a programming and/or configuration of the monitor instances $M_1$-$M_5$ such that the network packets associated with Return Traffic 1 are monitored in accordance with the logical monitoring arrangement specified in the SFC 402c described with reference to FIG. 4. In this example, the logical monitors 445, 446 are implemented as the monitor instance $M_2$ at the network switch 541, and the logical monitor 444 is implemented as the monitor instance $M_1$ at the network switch 540 and/or the monitor instance $M_2$ at the network switch 541 to monitor network packets as they propagate from one or more of the firewall NFs 511b-n to one or more of the NAT NF instances 512a-n and then to the DPI NF 510.

Figure 8:
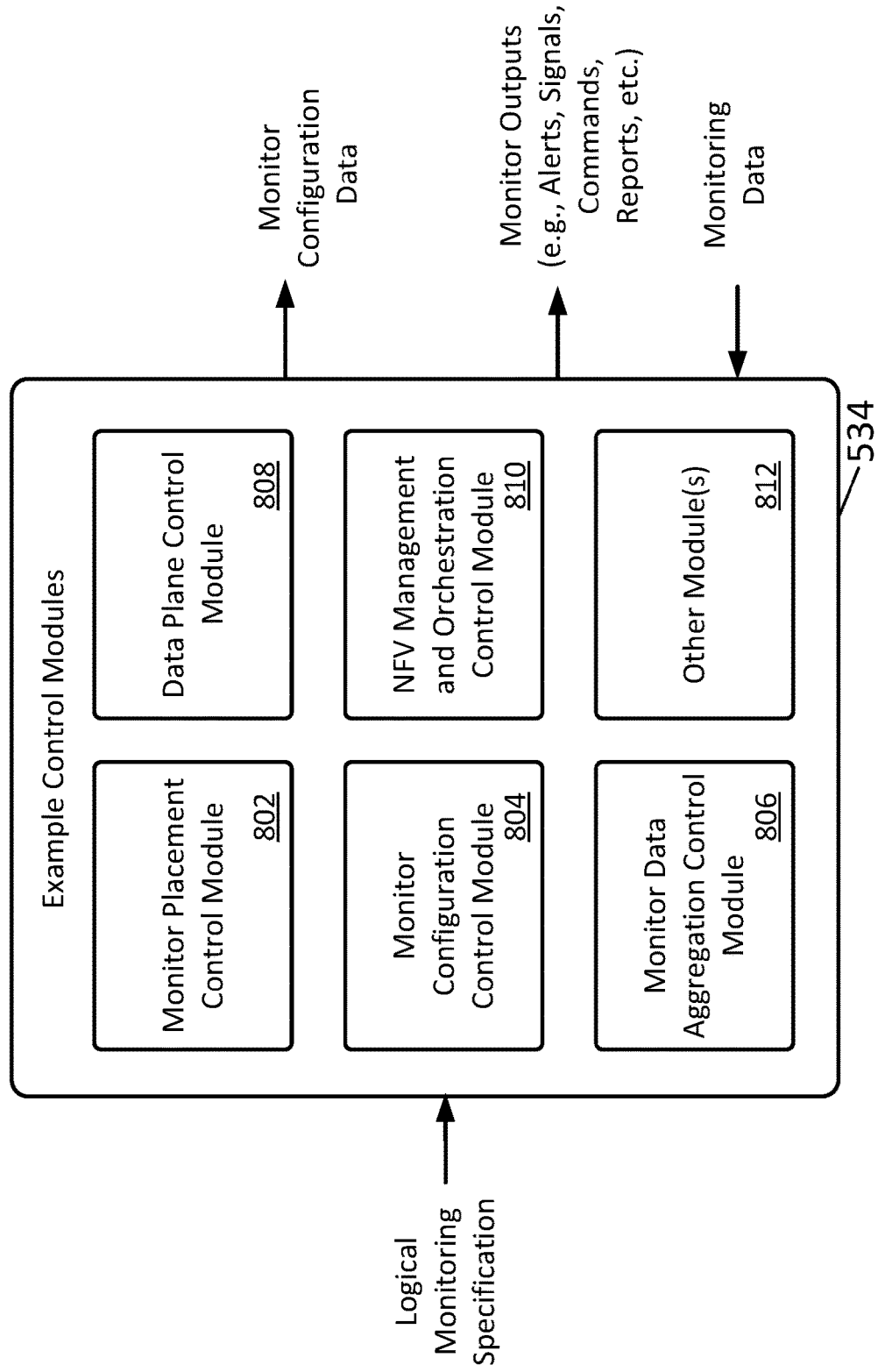
FIG. 8 illustrates example control modules of the network shown in FIG. 5, in accordance with some embodiments.

FIG. 8 illustrates a simplified example of the control module(s) 534, in accordance with some embodiments. As previously described, the monitoring system disclosed herein involves one or more network control modules that include or are in communication with a data plane component (e.g., the network switches 540-543 and/or the monitoring instance $M_5$) of the network 600. As has been described, one or more data plane components run on each of the compute nodes 530-533 where applications (NFs in an NFV context) run. The control module(s) 534 advantageously are operable to read the state of, as well as program the processing at, each of the data plane components of the network 600. Thus, the combination of the control module(s) 534 and the data plane components (i.e., the network switches 540-543) are operable to oversee a series of network functions (e.g., the NF instances 510-514) or other software applications of the network 600.

The data plane components are advantageously operable to measure (i.e., monitor) key metrics directly, without having to rely on information from other components of the network 600. In some embodiments, the control module(s) 534 are operable to receive monitoring data and to perform all necessary actions based on monitoring of the key metrics, including generating alerts, performing automated corrective actions and/or logging of key information using accurate real-time data plane information. For example, the control module(s) 534 can shut down an NF of the network 600 that is not seeing any network traffic or add another NF instance if the network traffic is high. In some embodiments, the control module(s) 534 are operable to use received monitoring data and metrics as inputs to one or more machine learning algorithms. In such embodiments, the one or more machine learning algorithms are operable to generate alerts, perform or initiate an action, recommend an action, or perform other actions and/or analysis using the received monitoring data and metrics.

In some embodiments, the control module(s) 534 are operable to schedule and execute periodic or on-demand changes to the network 600 in a superior and optimal fashion as compared to conventional solutions by having real-time state information of a real state of the system when such changes are executed. For example, rather than scheduling an action to be performed specifically at 2 am because network activity is usually slow at that time, the control module(s) 534 are operable to monitor for actual activity on the network 600 and to schedule that action when there is in fact no activity or minimal activity.

By having direct visibility to the data plane of the network 600, it is possible to measure exactly how much and what kinds of network traffic pass through each NF instance of the network 600. Data pertaining to such traffic can be captured, or logged, as needed, thus enabling the network operator to meter payment to an NF vendor based on actual usage of that NF.

Because the control module(s) 534 have a global view of all data plane components of the network 600, the control module(s) 534 are operable to coordinate the behavior of multiple data plane components. Such coordination enables, for example, distributed tracing or distributed logging of particular events of interest. For example, such coordination enables a "life of a packet" function within the network 600, whereby the performance/behavior of a network packet is recorded at every step of its processing, even when that processing spans multiple NFs and/or multiple compute nodes within the network 600. Such distributed tracing can be triggered programmatically based on calendar events, or other programmable conditions. Similarly, this capability can be used to do correlation analysis: e.g., determining that network packet drops at a particular network node are due to imperfect configuration of load-balancers at other network nodes, and so forth.

Such leveraging of the data plane components of the network 600 for monitoring (as opposed to relying on per-NF APIs/KPIs) enables a general monitoring architecture (i.e., measurements don't vary on a per-NF basis), streamlined (one component to measure), and more robust (since the measurements are consistent across all NFs) as compared to conventional monitoring solutions. For example, such monitoring is operable to use measurements from the data plane component (e.g., packet loss, latency, or throughput) to implement a unified approach to determining whether an NF component of the network 600 is overloaded or not.

As a simplified example, the control module(s) 534 may include one or more control modules, including: a monitor placement control module 802, a monitor configuration control module 804, a monitor data aggregation control module 806, a data plane control module 808, an NFV management and orchestration control module 810, and/or other module(s) 812, such as NF instance placement modules, NF controller modules, and NF service scaling modules. In some embodiments, one or more of the control module(s) 534 illustrated as separate control modules are part of the same control module. Similarly, in some embodiments, steps of the processes described herein are carried out by more than one control module. In the simplified example shown, one or more of the control module(s) 534 are operable to receive the logical monitoring specification and to generate monitoring configuration data to configure and/or instantiate one or more of the monitor instances $M_1$-$M_5$. Additionally, the one or more control module(s) 534 are operable to receive monitoring data from one or more of the monitor instances $M_1$-$M_5$ and to generate one or more monitor outputs based on the received monitoring data. In some embodiments, the monitor outputs include an alert, a signal that is propagated within the network 600, a command that is propagated within the network 600, a report, or another output or action as described with reference to FIG. 11.

In an example embodiment, the monitor placement control module 802 is operable to receive the logical monitoring specification and to determine at which of the compute nodes 530-533 the monitor instances $M_1$-$M_5$ should be instantiated and/or configured based on the logical monitoring specification. Such instantiation/configuration of the monitor instances is based on which logical components (e.g., logical NFs and/or SFCs) of the network 600 are identified by the logical monitoring specification. As a simplified example, if the logical monitoring specification identifies that the logical NAT NF 312 of the SFC 402a is to be monitored, the monitor placement control module in turn determines that the NAT NF instances 512a-n are provisioned at the compute node 531 of the network 600 and therefore a monitor instance (e.g., $M_2$) should be instantiated or configured at the network switch 541 of the compute node 531.

In some embodiments, the monitor placement control module 802 determines the mapping of a logical NF to an NF instance based on information exchanged and/or received from another of the control module(s) 534 of the network 600 (e.g., from the NFV management and orchestration control module 810, from a database of the other module(s) 812, from a hash table of the other module(s) 812, and/or from a load balancer of the other module(s) 812).

In other embodiments, the monitor placement control module 802 determines a mapping of a logical NF to an NF instance based on one or more NFV policy specifications received and/or stored at the monitor placement control module 802. In some embodiments, the NFV policy specification is, or includes, one or more of an instruction, a graph, a policy description, a status, a network state, or a configuration. Examples of NFV policy specifications include logical NFV policy specifications, sized NFV policy specifications, placed NFV policy specifications, and chained NFV policy specifications. A logical NFV policy specification specifies how traffic shall flow through a series of NFs (e.g., an NFV service) within a network to implement an NFV policy. A sized NFV policy specification specifies how many instances of each network component, e.g., an NF, are required to implement an NFV policy. A placed NFV policy specification specifies where network components which implement an NFV policy should be placed (e.g., deployed) within a network (e.g., within an NFV infrastructure). The chained NFV policy specification specifies how network traffic shall flow between network components (e.g., NFs) used to implement an NFV policy.

Returning attention to FIG. 8, in an example embodiment, the monitor configuration control module 804 is operable to receive the logical monitoring specification and/or monitor placement information from the monitor placement control module 802 and to propagate configuration data to one or more of the monitor instances $M_1$-$M_5$.

In an example embodiment, the monitor data aggregation control module 806 is operable to receive monitoring data from the one or more monitor instance $M_1$-$M_5$. In some embodiments, the monitor data aggregation control module 806 is advantageously operable to use the received monitoring data to perform network-wide analysis of the network 600 and/or to perform one or more actions based on the received monitoring data or upon results of the network analysis. Such analysis and actions are described in detail with respect to FIG. 11.

In an example embodiment, the data plane control module 808 is operable to configure a data plane component, such as one or more of the network switches 540-543 of the network 600. In some embodiments, the data plane control module 808 changes a configuration of a data plane component of the network 600 based on monitoring data received from the monitor instances $M_1$-$M_5$ and/or based on aggregated monitoring data generated, or actions performed, by the monitor data aggregation control module 806.

In an example embodiment, the NFV management and orchestration control module 810 is operable to communicate NF instance information (e.g., placement, state, or other information) to the monitor placement control module 802. In some embodiments, the NF and/or SFC placement information is embodied as an NFV policy specification.

Figure 9:
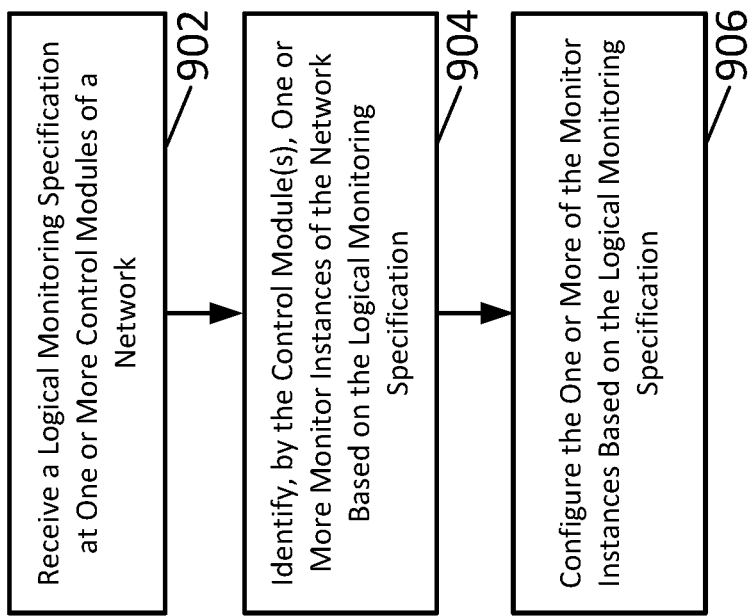
FIGS. 9-11 illustrate portions methods for operations of the network architecture shown in FIG. 5, in accordance with some embodiments.

FIG. 9 illustrates a portion of a process 900 which is performed all or in part at the control module(s) 534 and the monitor instances $M_1$-$M_4$ (and/or optional monitor instance $M_5$) of the network 600, in accordance with some embodiments. The particular steps, the order of steps, and the combination of steps are shown for illustrative and explanatory purposes only. Other embodiments can implement different particular steps, orders of steps, and combinations of steps to achieve similar functions or results. The steps of FIG. 9 are described with reference to FIGS. 4-6 and FIG. 8. At step 902, a logical monitoring specification is received at the control module(s) 534. At step 904, the control module(s) 534 use the logical monitoring specification to identify and/or instantiate one or more of the monitor instances $M_1$-$M_4$ of the network 600 (e.g., using the monitor placement control module 802). For example, based on a logical monitoring specification which indicates that network packets flowing through the logical firewall NF 311 and the logical NAT NF 312 of FIG. 4 shall be monitored (i.e., by a logical monitor 441), the control module(s) 534 identify the compute nodes 530, 531 corresponding to the firewall NF instance 511a and one or more of the NAT NF instances 512a-n. The control module(s) 534 additionally identify network switches 540, 541 associated with the compute nodes 530, 531, and thereby identify and/or instantiate monitor instances $M_1$, $M_2$. In some embodiments, the control module(s) 534 identify one of the network switches 540-543 at which a monitor instance is not currently instantiated. Thus, the control module(s) 534 are operable to receive a logical monitoring specification that includes a monitoring regime abstracted from a physical topology of the network and identify one or more monitoring instances based on the logical monitoring specification.

At step 906, the control module(s) 534 configure (e.g., configure or reconfigure) one or more of the monitor instances $M_1$-$M_4$ based on the logical monitoring specification (e.g., using the monitor configuration control module 804). In some embodiments, configuring the one or more monitor instance $M_1$-$M_4$ includes programming and/or instantiating one or more of the monitor instance $M_1$-$M_4$ at the network switches 540-543. In some embodiments, configuring the one or more monitor instance $M_1$-$M_4$ includes providing configuration data to the one or more monitor instances $M_1$-$M_4$. Such configuration data may include one or more of a data object, a directive, a monitoring criteria, a specification of monitoring data to collect, a specification of an action to perform based on collected monitoring data, an executable script, a database or table, or other data. Examples of such criteria are described next with reference to FIGS. 10-11.

Figure 10:
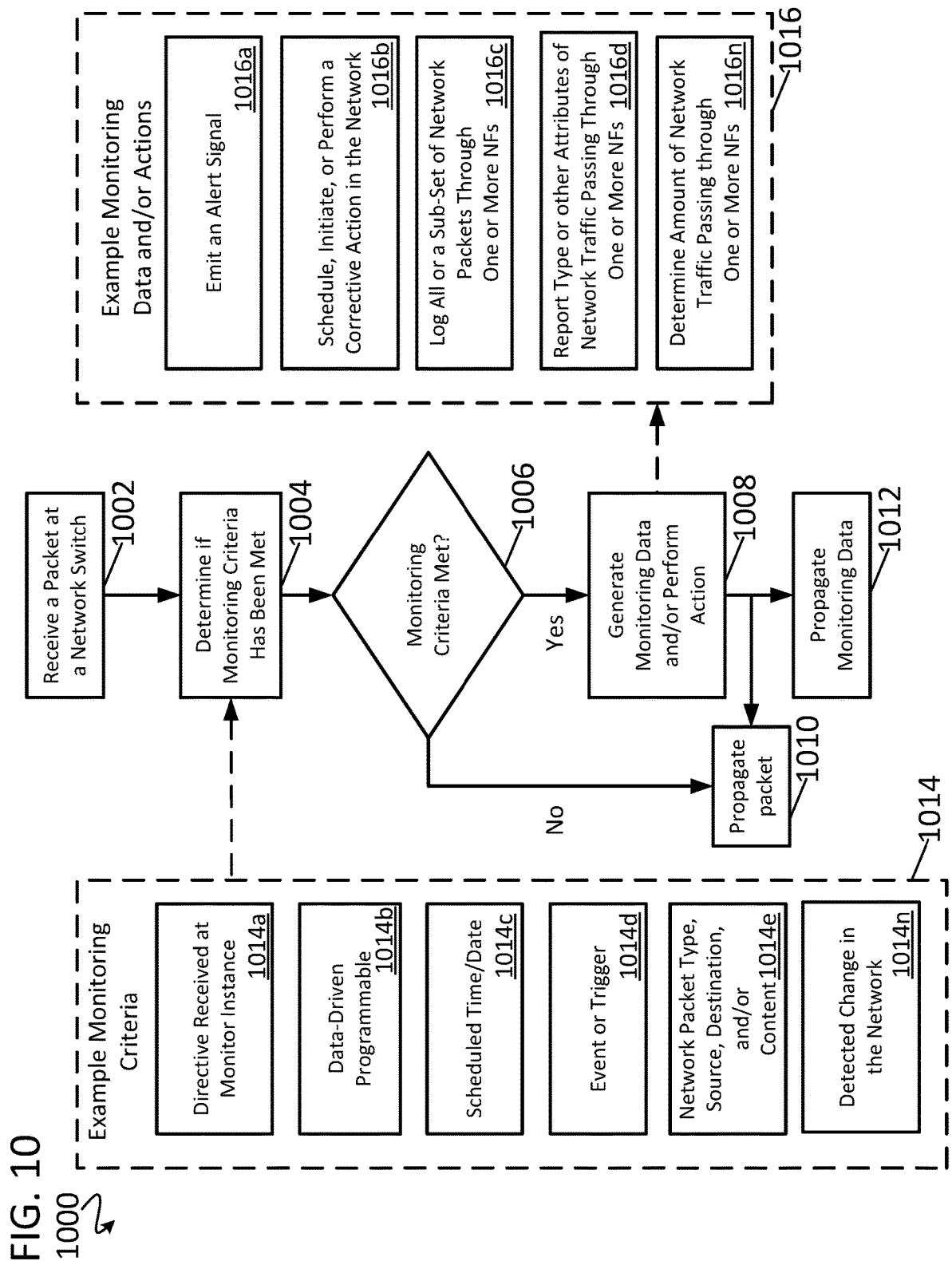

FIG. 10 illustrates a portion of a process 1000 which is performed all or in part at the monitor instances $M_1$-$M_4$ (and/or optional monitor instance $M_5$), in accordance with some embodiments. The particular steps, the order of steps, and the combination of steps are shown for illustrative and explanatory purposes only. Other embodiments can implement different particular steps, orders of steps, and combinations of steps to achieve similar functions or results. The steps of FIG. 10 are described with reference to FIGS. 4-6. At step 1002, a network packet (e.g., of Forward Traffic 1, Forward Traffic 2, or Return Traffic) is received at one of the network switches 540-543 (or other data plane component). In some embodiments, the network packet is instead received at the optional monitor instance $M_5$. At step 1004, it is determined at the monitor instance (e.g., $M_1$) if monitoring criteria has been met. As described with respect to step 906 of the process 900, in some embodiments such monitoring criteria is specified by the control module(s) 534 as part of configuring the one or more monitoring instances $M_1$-$M_4$ based on the logical monitoring specification.

Example monitoring criteria 1014a-1014n is shown in box 1014. As shown, the monitoring criteria may include one or more of the following: i) monitoring criteria 1014a based on a directive received at the monitor instance for ad hoc or on-demand monitoring for near real-time instantiation, change, or deletion of monitoring or monitor instances; ii) monitoring criteria 1014b based on a data-driven programmable process such as an algorithm, a software process, a Boolean expression (e.g., if-then-else), a threshold crossing, an artificial intelligent process, a machine learning process, or a deep learning process, such monitoring criteria ranging from relatively simple threshold crossing detection processes to processes that rely on extended data capture for detecting exceptions and anomalies; iii) monitoring criteria 1014c based on one or more scheduled times and/or dates such as a single data/time, or a recurring data/time; iv) monitoring criteria 1014d based on an event or trigger such as a signal issued by another component of the network 600; v) monitoring criteria 1014e based on a network packet type, a source of the network packet, a destination of the network packet, and/or contents of the network packet; and/or vi) criteria 1014n based on a detected change in the network 600 (e.g., an addition, deletion, suspension, or relocation of one or more NFs of the network). As shown, monitoring instances $M_1$-$M_4$ are operable to support substantially different monitoring criteria such as that shown in box 104. In some examples, a first monitor instance that is an instantiation of a first code base may be operable to be configured and/or programmed to monitor based on a first monitoring criteria, but a second monitoring criteria may be incompatible with the first code base. For example, if the first code base is operable to monitor based on a scheduled time/date (e.g., criteria 1014c), that same code base may not be operable to monitor based on a machine learning algorithm (e.g., criteria 1014b). Similarly, a second monitor instance that is an instantiation of a second code base may be operable to monitor based on the machine learning algorithm (e.g., criteria 1014b), but may not be operable to monitor based on a scheduled time/date (e.g., criteria 1014c). For example, a conventional monitoring solution may use the same code base upon which different match-action rules are run. Such monitoring criteria advantageously provides more flexibility than conventional monitoring solutions having a fixed code base which rely on simple filters and match-action rules.

Returning to the process flow, at step 1006 it is determined if the monitoring criteria has been met. If at step 1006 it is determined that the monitoring criteria has been met (e.g., satisfied), the flow of the process 1000 continues to step 1008. At step 1008 the monitor instance (e.g., $M_1$) at the network switch generates monitoring data and/or performs one or more actions. In some embodiments, the one or more actions are performed at, or by, the monitor instance. In other embodiments, the one or more actions are performed by another module of the network 600 and in conjunction with the monitor instance. In still yet other embodiments, the one or more actions are performed by another module of the network 600 and are not performed in conjunction with the monitor instance. In some embodiments, the one or more actions performed by the monitor instance and/or another module of the network 600 are specified by a logical monitoring specification. In other embodiments, the one or more actions performed by the monitor instance and/or another module of the network 600 are specified by another specification or are part of a configuration of the monitor instance and/or another module of the network 600. Example monitoring data and actions 1016a-n are shown in box 1016. As shown, the monitoring data and/or performed action may include one or more of the following: i) an action 1016a that includes emitting an alert signal, e.g., to a logging system, to a remote terminal, to the network operator of the network 600, and/or to a customer of the network operator; ii) an action 1016b that includes scheduling, initiating (e.g., sending a signal to another component of the network 600) or performing a corrective action in the network 600, e.g., instantiating, pausing, moving, or deleting one or more NFs of the network 600, updating a load balancer of the network 600, and/or changing a configuration of the data plane of the network 600; iii) generating monitoring data 1016c that includes a log of all or a subset of network packets that are propagated by, through, or to, one or more NFs of the network 600, in particular, one or more of the NFs that are associated with the network switch at which the monitor instance is instantiated; iv) an action 1016d that includes generating a report of the type or other attributes of network packets passing through one or more NFs of the network 600, in particular one or more of the NFs that are associated with the network switch at which the monitor instance is instantiated; v) one or more change management actions for the network 600, and/or vi) generating monitoring data 1016n that includes a measured amount of network traffic passing through one or more of the NFs of the network 600, in particular, one or more of the NFs that are associated with the network switch at which the monitor instance is instantiated.

After step 1008, or after step 1006 in the case where monitoring criteria is not met, flow continues to step 1010. At step 1010, the network packet received at step 1002 is propagated within the network 600, e.g., to one of the NFs 510-515 and/or to one of the network switches 540-543, or to another component of, or coupled to, the network 600. Thus, the network packet received at the network switch is the same network packet instance that is received at the monitor instance and is the same network packet instance that is propagated from the network switch, i.e., the network packet is not duplicated or mirrored. Such propagation is in contrast to conventional monitoring solutions that may mirror network packets, such conventional monitoring solutions typically consuming (e.g., dropping) a mirrored network packet after desired measurements are performed.

At step 1012, monitoring data generated at step 1008 is propagated to the control module(s) 534. As previously described, in some embodiments, the control module(s) 534 aggregate received monitoring data to perform network-wide analysis of network traffic flow through the network 600. Additionally, the control module(s) 534 may use received monitoring data to perform higher-level analysis or reporting than is performed at the monitor instances $M_1$-$M_4$.

Figure 11:
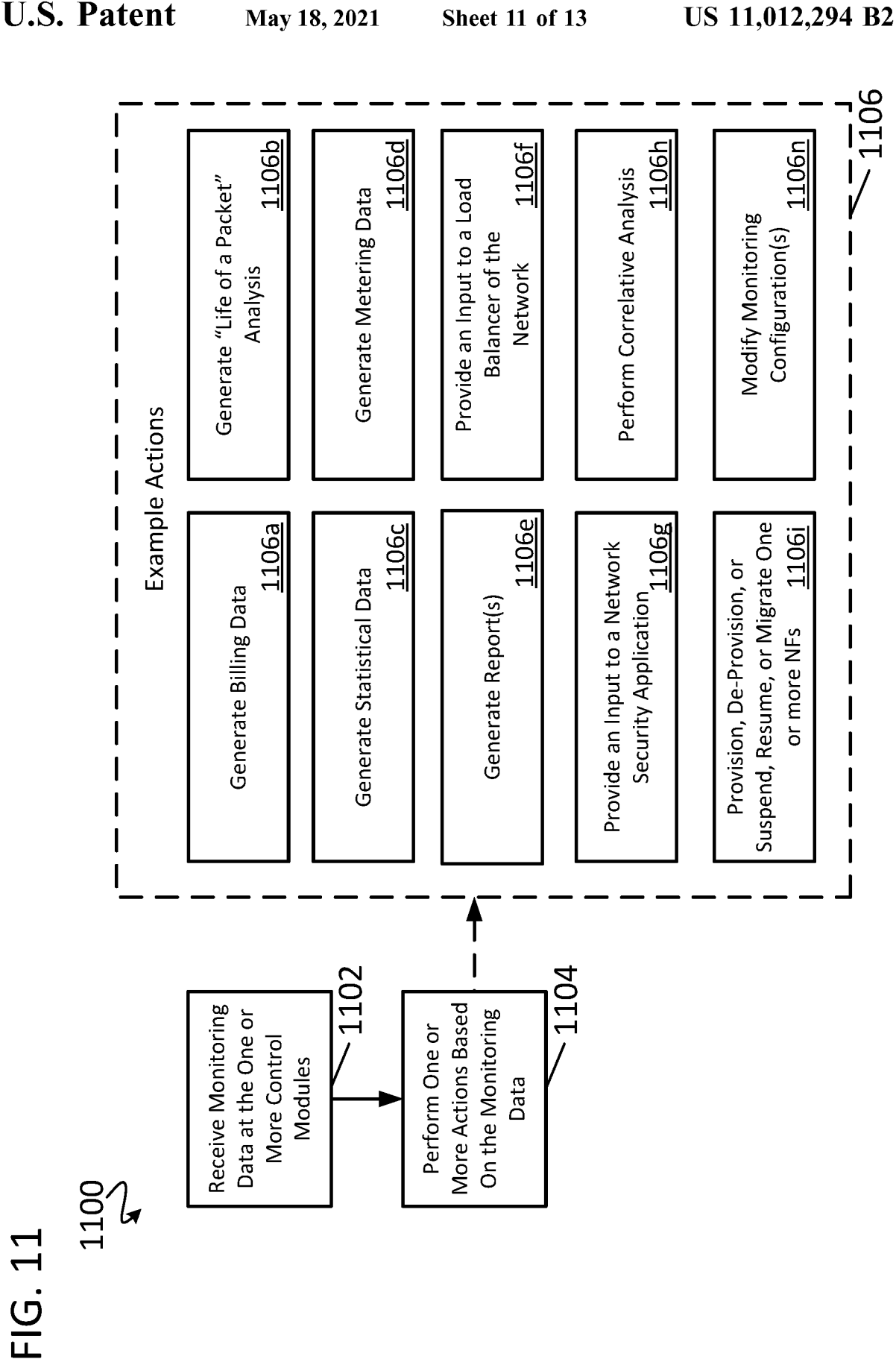

FIG. 11 illustrates a portion of a process 1100 which is performed all or in part at the control module(s) 534, in accordance with some embodiments. As illustrated in FIG. 11, propagated monitoring data received at the control module(s) 534 may be used by the control module(s) 534 to perform one or more actions. The particular steps, the order of steps, and the combination of steps are shown for illustrative and explanatory purposes only. Other embodiments can implement different particular steps, orders of steps, and combinations of steps to achieve similar functions or results. The steps of FIG. 11 are described with reference to FIGS. 4-6 and FIG. 8. At step 1102, monitoring data that was propagated at step 1012 of the process 1000 is received at one or more of the control module(s) 534 (e.g., at the Monitor Data Aggregation Control Module 806). At step 1104, one or more actions are performed at the control module(s) 534 based on the received monitoring data. Example actions 1106*a-n* are shown in box 1106. As shown, the actions may include one or more of the following: i) an action 1106*a* that includes generating billing data based on the received monitoring data, e.g., billing data based on a running total or "high-water-mark" or other aggregate usage metrics of network packets and/or processing performed by one or more NFs or SFCs of the network 600 in a given time or billing period; ii) an action 1106*b* that includes performing or generating "Life of a Packet" analysis, i.e., tracing a particular network packet as that network packet traverses all or a portion of the network 600 across two or more compute nodes; iii) an action 1106*c* that includes generating statistical data based on the received monitoring data; iv) an action 1106*d* that includes generating metering data, e.g., an aggregate of network traffic through one or more NFs or SFCs of the network 600 that is used for billing a network customer; v) an action 1106*e* that includes generating one or more reports based on the received monitoring data, the reports being, for example: rendered at a "dashboard", at a user interface, at a webpage, at a network terminal, at a mobile device, as a printed report, as a presentation, as a spreadsheet, as a database, as an emailed report, in virtual or augmented reality, or as another type of report; an action 1106*f* that includes providing an input or configuration to a load balancer of the network 600 based on the received monitoring data; vii) an action 1106*g* that includes providing an input to a network security application of the network based on the received monitoring data; viii) an action 1106*h* that includes performing correlative analysis based on the received monitoring data; ix) an action 1106*i* that includes provisioning (i.e., instantiating), de-provisioning, suspending, resuming, pausing, or migrating one or more of the NFs 510-515 of the network 600 based on the received monitoring data; and/or an action 1106*n* that includes modifying one or more of the monitoring configurations of the monitor instances $M_1$-$M_4$ based on the received monitoring data, e.g., modifying monitoring criteria, monitoring data collected, modifying actions performed, instantiating a new monitor instance within the network 600, or removing a monitor instance from the network 600. In some examples, a first monitor instance that is an instantiation of a first code base may be operable to be configured and/or programmed to perform one or more first actions based on a first monitoring configuration, but a second monitoring configurations specifying one or more second actions may be incompatible with the first code base. For example, if the first code base is operable to generate billing data (e.g., action 1106*a*), that same code base may not be operable to generate "life of a packet" analysis (e.g., action 1106*b*). Similarly, a second monitor instance that is an instantiation of a second code base may be operable to generate "life of a packet analysis (e.g., action 1106*b*), but may not be operable to generate billing data (e.g., action 1106*a*). Such monitoring configuration and/or programming advantageously provides more flexibility than conventional monitoring solutions having a fixed code base which rely on simple filters and match-action rules.

In some embodiments, the metering data used or produced by an action of the actions 1106 includes billing data (e.g., metered at dollars per bit processed, dollars per hour of operation for an NF instance, dollars per core used, etc.). In some embodiments, values of the metering data are received by an operator of the network 600 and/or are provided to a Business Operations Services and Systems (BOSS) for billing an end user (e.g., a customer of the network operator). In some embodiments, the end user (e.g., the customer) may only receive finalized billing data and does not receive the metering data.

Figure 12:
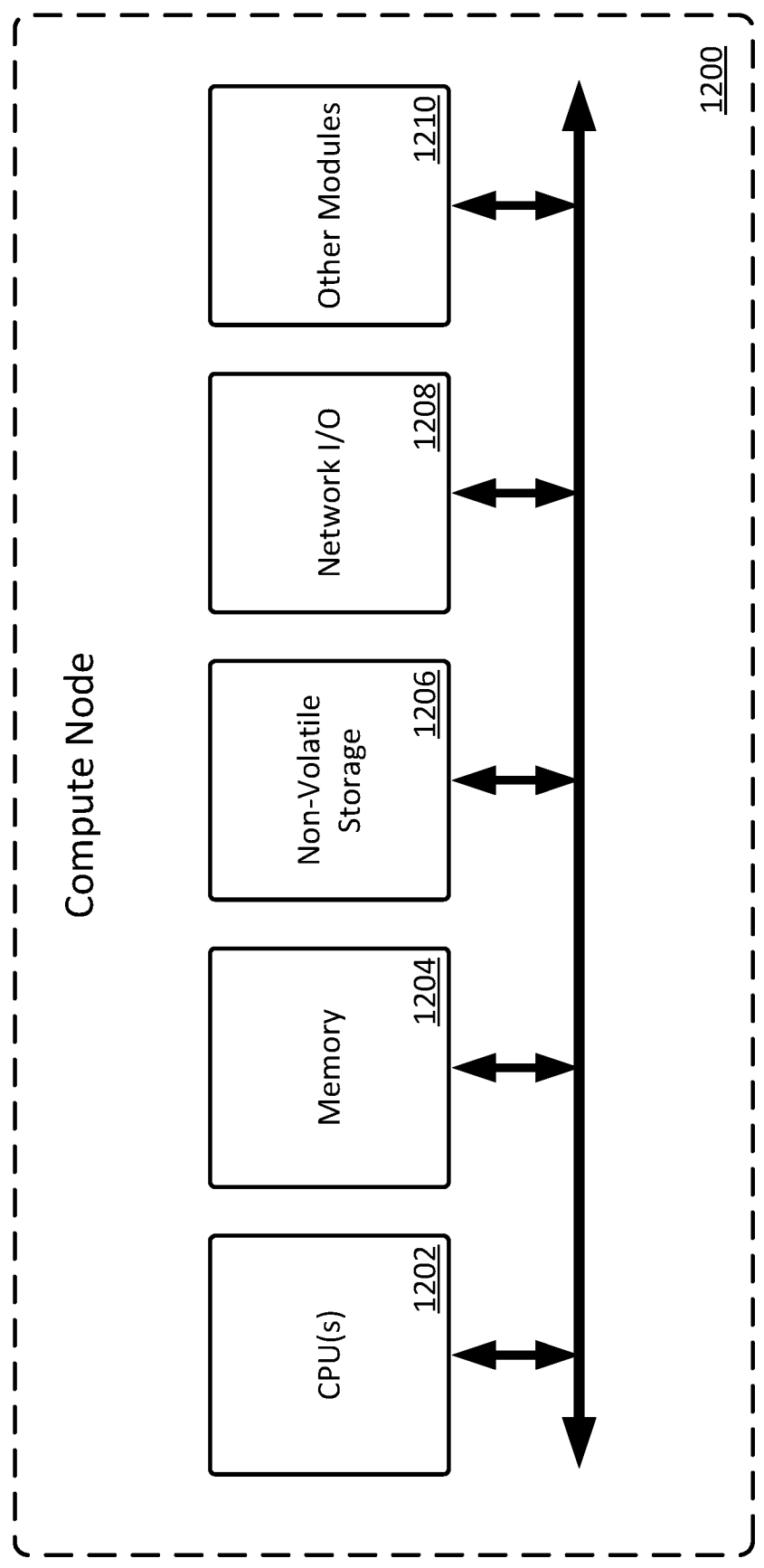
FIGS. 12-13 illustrate an example compute node of the network architecture shown in FIG. 5, in accordance with some embodiments.

FIG. 12 illustrates an example compute node 1200, in accordance with some embodiments. In some embodiments, one or more of the compute nodes 530-533 of the network 600 are the same as or similar to the compute node 1200. The compute node 1200 generally includes one or more central processing units (CPUs) 1202, a memory module 1204 (e.g., RAM), a non-volatile data storage module 1206 (e.g., a hard drive or array of hard drives), a network I/O module 1208 (e.g., a network interface card (NIC) and/or a top-of-rack interface), and other modules 1210 such as user I/O, wireless communication modules, optical communication modules, system diagnostic or monitoring modules, or other modules, one or more of the modules 1202-1210 being connected by one or more data busses. In some embodiments, the compute node 1200 is configured to perform all or a portion of the process steps discussed with reference to FIGS. 9-11. The non-volatile data storage module 1206, thus, stores data and several programs for some or all of the above-described functions and process steps, among others. The data and programs are loaded into the memory module 1204, so that the one or more CPUs 1202 (in conjunction with the memory module 1204) can perform some or all of the above-described functions and process steps, among others. In some embodiments, the CPUs 1202 are shared or dedicated CPUs. These CPUs could perform a single network function, perform multiple network functions, or perform other tasks in addition to performing network functions. Examples of the CPUs 1202 include microprocessors, digital signal processors, microcontrollers, and dedicated hardware such as ASICs (Application Specific Integrated Circuits) and FPGAs (Field Programmable Gate Arrays).

Figure 13:
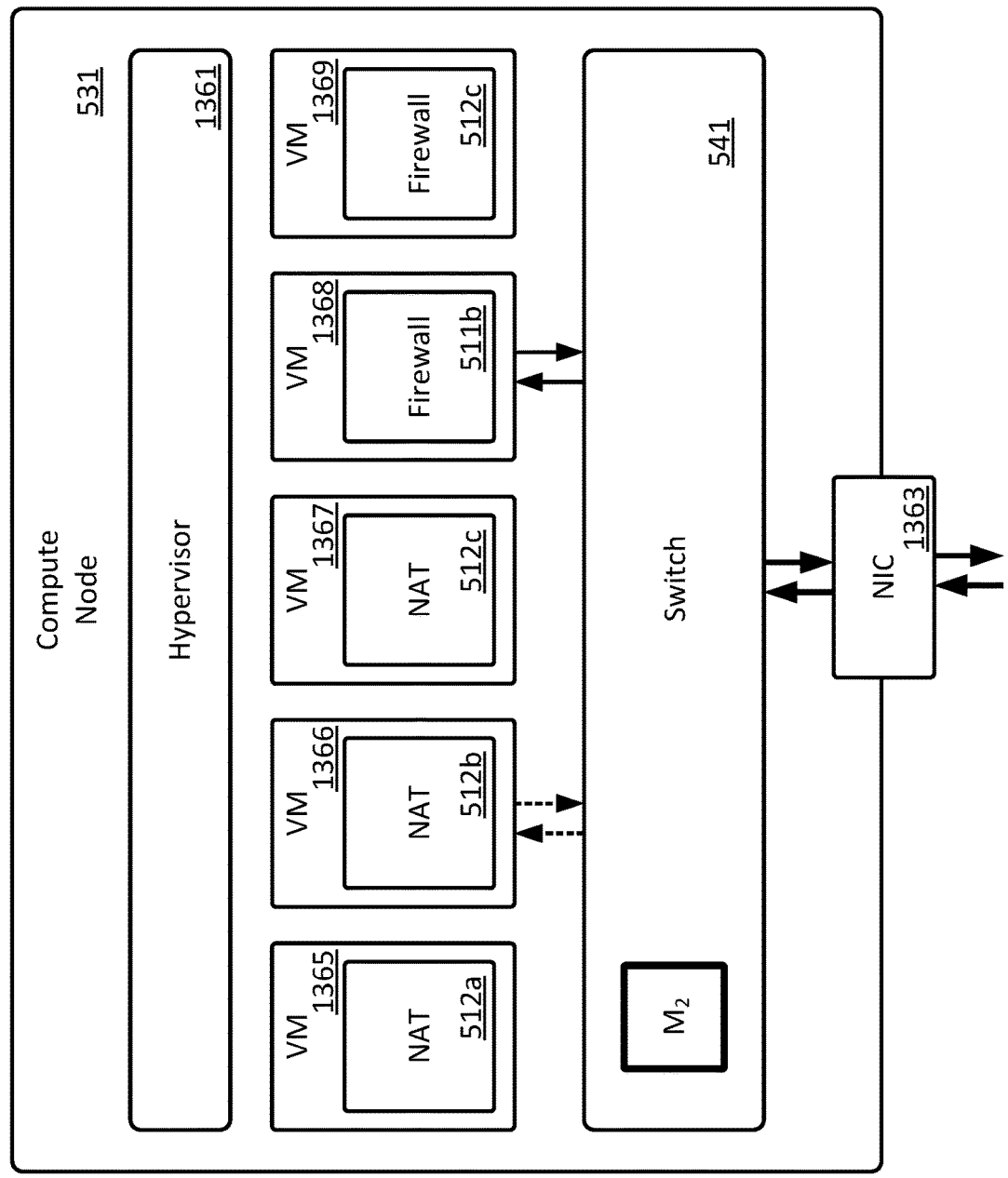

FIG. 13 illustrates a simplified example realization of the compute node 531 of the network 600, in accordance with some embodiments. Some modules or elements understood to be present at the compute node 531 have been omitted for simplicity. Other compute nodes of the network 600 may be implemented the same or similarly to the compute node 531. The compute node 531 generally includes a hypervisor module 1361 for instantiating, deleting, monitoring and managing one or more virtual machines (VMs) 1365-1369. In some embodiments, the VMs 1365-1369 are instead containers. The compute node 531 also includes the network switch (e.g., a software network switch, sometimes also referred to as a vSwitch) 541 which routes network packets between a NIC 1363 of the compute node 531 and the VMs 1365-1369. In the embodiment shown, the monitor instance $M_2$ is instantiated within (e.g., as a module) or communicatively coupled to the network switch 541.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only and is not intended to limit the invention.

What is claimed is:

1. A method, comprising:
receiving, at one or more control modules of a network, a logical monitoring specification, the logical monitoring specification comprising a monitoring regime abstracted from a physical topology of the network;
performing one of instantiating or identifying, by the one or more control modules, one or more monitor instances of the network based on the logical monitoring specification, the one or more monitor instances being or having been instantiated within one or more data plane components of the network; and
configuring, by the one or more control modules, the one or more monitor instances based on the logical monitoring specification.

2. The method of claim 1, wherein:
the one or more data plane components comprise a software network switch.

3. The method of claim 1, wherein:
the one or more monitor instances are in-line to a network packet flow within a data plane of the network.

4. The method of claim 1, wherein:
the physical topology of the network comprises the one or more monitor instances and one or more software network function (NF) instances.

5. The method of claim 4, wherein:
the logical monitoring specification indicates one or more logical NFs of the network to be monitored.

6. The method of claim 5, wherein:
the one or more control modules map each of the one or more logical NFs to a respective corresponding NF instance of the network.

7. The method of claim 1, wherein configuring the one or more monitor instances comprises:
configuring a first monitor instance of the one or more monitor instances to monitor a network traffic flow of the network if a first monitoring criteria is met.

8. The method of claim 7, wherein configuring the one or more monitor instances comprises:
configuring a second monitor instance of the one or more monitor instances to monitor the network traffic flow of the network if a second monitoring criteria is met, the second monitoring criteria being substantially different than the first monitoring criteria.

9. The method of claim 1, wherein configuring the one or more monitor instances comprises:
configuring a first monitor instance of the one or more monitor instances to perform one or more first actions based on first monitoring data generated by the first monitor instance.

10. The method of claim 9, wherein configuring the one or more monitor instances comprises:
configuring a second monitor instance of the one or more monitor instances to perform one or more second actions based on second monitoring data generated by the second monitor instance, the one or more second actions being substantially different than the one or more first actions.

11. The method of claim 1, further comprising:
initializing, at a first monitor instance of the one or more monitor instances, a first software process having a first code base; and
initializing, at a second monitor instance of the one or more monitor instances, a second software process having a second code base, the first code base being substantially different than the second code base.

12. The method of claim 11, further comprising:
configuring, based on a first configuration, the first monitor instance to perform one or more first actions based on first monitoring data generated by the first monitor instance; and
configuring, based on a second configuration, the second monitor instance to perform one or more second actions based on second monitoring data generated by the second monitor instance, the first configuration being incompatible with the second code base, and the second configuration being incompatible with the first code base.

13. The method of claim 11, further comprising:
configuring, based on a first configuration, the first monitor instance to monitor a network traffic flow of the network if a first monitoring criteria is met; and
configuring, based on a second configuration, the second monitor instance to monitor the network traffic flow of the network if a second monitoring criteria is met, the first configuration being incompatible with the second code base, and the second configuration being incompatible with the first code base.

14. The method of claim 1, wherein configuring the one or more monitor instances comprises:
generating, by the one or more control modules, one or more monitoring configurations based on the logical monitoring specification; and identifying, by the one or more control modules, the one or more monitor instances based on the logical monitoring specification; and propagating, by the one or more control modules, the one or more monitoring configurations to the one or more monitor instances.

15. The method of claim 14, further comprising:

monitoring, by the one or more monitor instances, a network packet flow of the network based on the one or more monitoring configurations.

16. The method of claim 1, further comprising:

receiving a network packet at a first monitor instance of the one or more monitor instances, the first monitor instance being instantiated at a compute node of the network; and propagating, by the first monitor instance, the network packet in the network.

17. The method of claim 16, wherein propagating the network packet in the network comprises:

propagating the network packet to a software network function (NF) instance of the network, the NF instance being instantiated at the compute node.

18. The method of claim 16, further comprising:

determining, by the first monitor instance, if a monitoring criteria is met;

generating, at the first monitor instance, monitoring data using the network packet if the monitoring criteria is met, wherein the monitoring data is not generated if the monitoring criteria is not met; and propagating, by the first monitor instance if the monitoring data is generated, the monitoring data to the one or more control modules.

19. The method of claim 1, further comprising:

receiving, at a first data plane component of the one or more data plane components, a network packet;

determining, by a first monitor instance of the one or more monitor instances, if a monitoring criteria is met, the first monitor instance being instantiated at the first data plane component;

generating, at the first monitor instance, monitoring data using the network packet if the monitoring criteria is met, wherein the monitoring data is not generated if the monitoring criteria is not met;

propagating, by the first monitor instance if the monitoring data is generated, the monitoring data to the one or more control modules; and propagating, by the first monitor instance, the network packet.

20. The method of claim 19, further comprising:

receiving, at the one or more control modules, the monitoring data; and performing, by the one or more control modules, one or more actions based on the monitoring data, the one or more actions being specified by the logical monitoring specification.

21. The method of claim 1, wherein identifying the one or more monitor instances of the network comprises:

identifying, by the one or more control modules, a first logical software network function (NF) specified by the logical monitoring specification;

identifying, by the one or more control modules, a first NF instance of the network, the first NF instance being an instance of the first logical NF, the first NF instance being instantiated at a first compute node of the network; and identifying, by the one or more control modules, a first monitor instance of the one or more monitor instances of the network, the first monitor instance being instantiated at the first compute node.

22. The method of claim 21, further comprising:

generating, at the first monitor instance, first monitoring data corresponding to the first NF instance; and propagating, by the first monitor instance, the first monitoring data to the one or more control modules.

23. The method of claim 22, further comprising:

identifying, by the one or more control modules, a second logical NF specified by the logical monitoring specification;

identifying, by the one or more control modules, a second NF instance of the network, the second NF instance being an instance of the second logical NF, the second NF instance being instantiated at a second compute node of the network; and identifying, by the one or more control modules, a second monitor instance of the one or more monitor instances of the network, the second monitor instance being instantiated at the second compute node.

24. The method of claim 23, further comprising:

generating, at the second monitor instance, second monitoring data corresponding to the second NF instance; and propagating, by the second monitor instance, the second monitoring data to the one or more control modules.

* * * * *